US009819717B2

(12) United States Patent
Oyman et al.

(10) Patent No.: US 9,819,717 B2
(45) Date of Patent: Nov. 14, 2017

(54) VIDEO ADAPTATION FOR CONTENT-AWARE WIRELESS STREAMING

(75) Inventors: Ozgur Oyman, San Jose, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 13/977,039

(22) PCT Filed: Dec. 28, 2011

(86) PCT No.: PCT/US2011/067593
§ 371 (c)(1),
(2), (4) Date: May 1, 2014

(87) PCT Pub. No.: WO2013/100968
PCT Pub. Date: Jul. 4, 2013

(65) Prior Publication Data
US 2014/0258552 A1 Sep. 11, 2014

(51) Int. Cl.
*H04L 29/06* (2006.01)
*H04L 12/825* (2013.01)
*H04N 19/10* (2014.01)
*H04N 21/24* (2011.01)
*H04N 21/41* (2011.01)
(Continued)

(52) U.S. Cl.
CPC .......... *H04L 65/607* (2013.01); *H04L 47/263* (2013.01); *H04L 65/602* (2013.01); *H04L 65/80* (2013.01); *H04N 19/10* (2014.11); *H04N 19/146* (2014.11); *H04N 19/152* (2014.11); *H04N 21/2402* (2013.01); *H04N 21/4122* (2013.01); *H04N 21/41407* (2013.01);
(Continued)

(58) Field of Classification Search
CPC ............. H04N 19/10–19/196; H04N 21/41–21/44209; H04N 21/234–21/23439; H04N 21/4122; H04N 21/4325–21/43637; H04L 65/80; H04L 65/60–65/605; H04L 47/10–47/26; H04L 43/0864–43/0888
See application file for complete search history.

(56) References Cited

U.S. PATENT DOCUMENTS 7,925,774 B2 4/2011 Zhang et al.
2007/0263720 A1 11/2007 He
(Continued)

FOREIGN PATENT DOCUMENTS

WO 2013/100968 A1 7/2013

OTHER PUBLICATIONS

International Preliminary Report on Patentability and Written Opinion received for PCT Application No. PCT/US2011/067593, dated Jul. 10, 2014, 12 pages.
(Continued)

*Primary Examiner* — Wing F Chan
*Assistant Examiner* — Raji Krishnan
(74) *Attorney, Agent, or Firm* — Schiff Hardin LLP

(57) ABSTRACT

Described herein are techniques related to wirelessly streaming content to a remote display device. Parameters are selected for the streaming based on content information received via an application programming interface (API) associated with a media player. This Abstract is submitted with the understanding that it will not be used to interpret or limit the scope or meaning of the claims.

18 Claims, 6 Drawing Sheets

(51) Int. Cl.
  *H04N 19/152*    (2014.01)
  *H04N 21/414*    (2011.01)
  *H04N 21/4363*   (2011.01)
  *H04N 21/4402*   (2011.01)
  *H04N 21/442*    (2011.01)
  *H04N 19/146*    (2014.01)

(52) U.S. Cl.
  CPC ... *H04N 21/43637* (2013.01); *H04N 21/4402* (2013.01); *H04N 21/44227* (2013.01)

(56) References Cited

U.S. PATENT DOCUMENTS

| | | | | |
|---|---|---|---|---|
| 2008/0049703 | A1* | 2/2008 | Kneckt | H04W 68/00 370/342 |
| 2008/0123741 | A1 | 5/2008 | Li et al. | |
| 2008/0291891 | A1* | 11/2008 | Jerlhagen | H04L 43/0864 370/350 |
| 2009/0019178 | A1* | 1/2009 | Melnyk | H04L 47/10 709/233 |
| 2010/0154023 | A1* | 6/2010 | Dey | H04N 21/41407 725/151 |
| 2010/0191859 | A1* | 7/2010 | Raveendran | H04L 65/605 709/231 |
| 2010/0316066 | A1* | 12/2010 | Leung | H04N 21/44209 370/468 |
| 2011/0002399 | A1* | 1/2011 | Raveendran | H04H 20/42 375/240.28 |
| 2011/0258338 | A1* | 10/2011 | Vass | H04N 7/148 709/233 |
| 2012/0147946 | A1* | 6/2012 | Gao | H04N 19/10 375/240.02 |
| 2012/0155398 | A1* | 6/2012 | Oyman | H04L 47/26 370/329 |
| 2012/0236720 | A1* | 9/2012 | Dominguez Romero | H04L 65/80 370/235 |
| 2013/0007200 | A1* | 1/2013 | van der Schaar | H04L 43/0888 709/217 |

OTHER PUBLICATIONS

International Search Report and Written Opinion received for PCT Patent Application No. PCT/US2011/067593, dated Sep. 19, 2012, 10 pages.

* cited by examiner

VIDEO ADAPTATION FOR CONTENT-AWARE WIRELESS STREAMING

BACKGROUND

The proliferation of mobile communications and computing devices, particularly hand-held and tablet versions, has brought about an increase in the capacity and capability of such devices. Fueling the increased capacity and capability are a multitude of applications designed for the devices that provide user information and entertainment experiences when executed on the devices. Such applications provide multimedia content to the user including videos, movies, news programs, games, and the like.

While the portability of these mobile devices is convenient, often it is desirable to enjoy the content provided by the applications on a larger viewing screen or display. Accordingly, some mobile devices are capable of transmitting (i.e., streaming) content from the device to a larger display via a wireless connection.

However, the link quality of the wireless connection and the type of content transmitted to the display can vary over time while streaming. This may have a negative impact on the quality of the experience for the user, including loading or buffering delays, interruptions, and poor video quality.

BRIEF DESCRIPTION OF THE DRAWINGS

The Detailed Description references the accompanying figures. In the figures, the left-most digit(s) of a reference number identifies the figure in which the reference number first appears. The same reference number references like features and components throughout the drawings.

DETAILED DESCRIPTION

Figure 1:
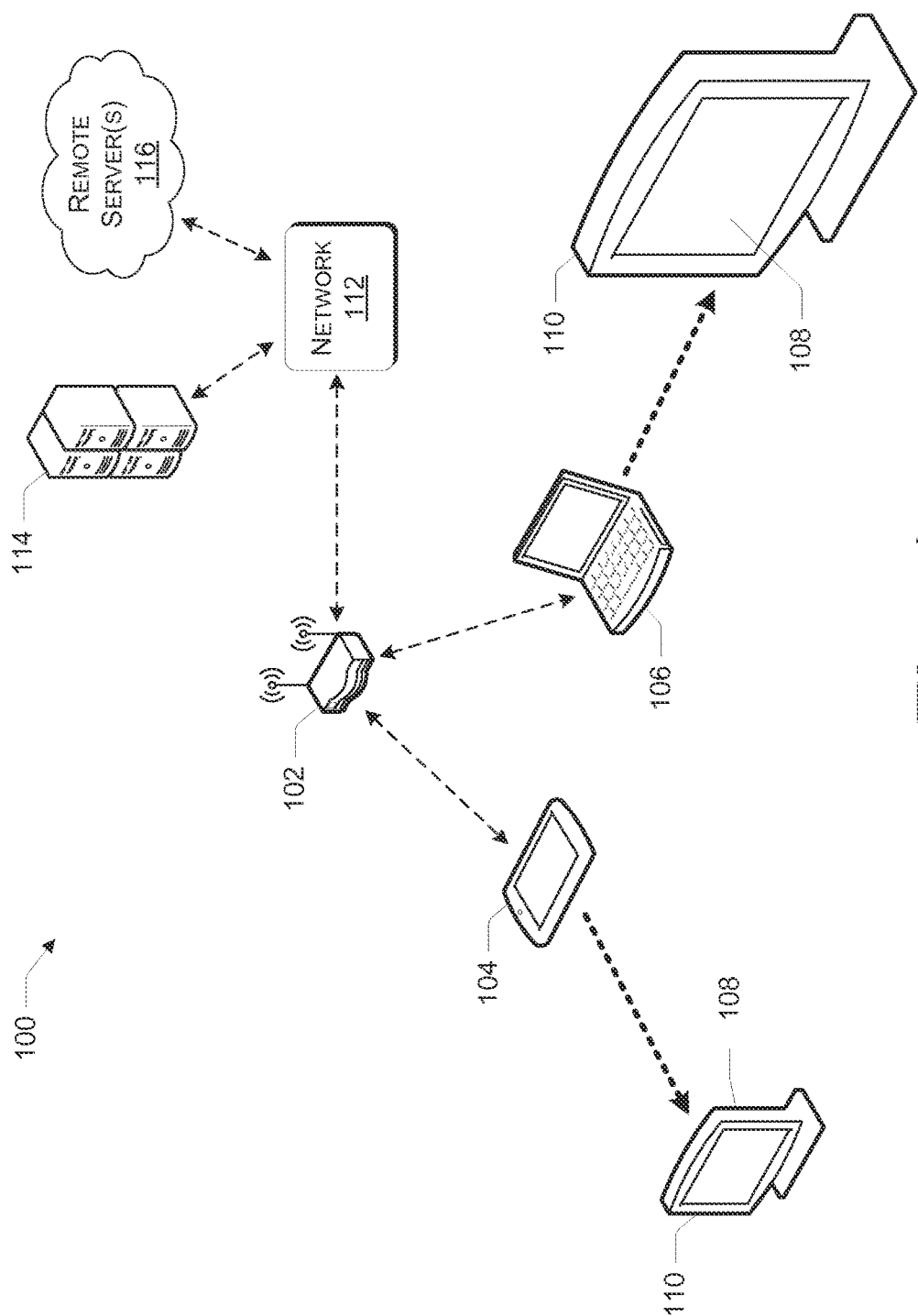
FIG. 1 is a schematic diagram illustrating an example environment in which the techniques in accordance with the present disclosure may be implemented.

Described herein are techniques related to wirelessly streaming multimedia content to a remote display device. Specifically, techniques and systems are disclosed that provide dynamically adaptive wireless streaming to a remote device, such that the quality of the experience (QoE) to the user s optimized, including during changing link conditions with varying streamed multimedia content. Accordingly, the techniques and systems reduce, if not eliminate, interruptions, delays, poor quality video and/or audio, and the like, during streaming. The techniques and systems are discussed in terms of wirelessly streaming content from a mobile communications or computing device to a remote display device. This is not intended as a limitation and other implementations that include streaming between devices or systems are within the scope of this disclosure.

Adaptive streaming techniques that provide an optimized QoE to a user may include dynamically optimizing various streaming parameters and/or configurations such as bit rate, resolution, and frame rate, as well as network and/or radio configurations such as bandwidth allocation and quality of service (QoS) with respect to changing link conditions, device capabilities and content characteristics. To that end, it is desirable to have awareness and intelligence in an adaptive streaming environment that includes: link-awareness, meaning an awareness of varying channel quality and network conditions; device-awareness, meaning an awareness of different device capabilities (e.g., display size, resolution, other display properties, codec support, container format support, buffer/storage capacity, CPU processing power, decoding capabilities, pre-decoder buffer size, initial buffering period, streaming method, adaptation support information, quality of experience (QoE) support information, extended real time transport control protocol (RTCP) reporting support, fast content switching support, supported real-time transport protocol (RTP) profile information, and session description protocol (SDP) attributes, etc.); and/or content-awareness, meaning an awareness of different multimedia content characteristics (e.g., bitrate, quality, bandwidth information, coding/compression information, container format, represented in terms of various standardized formats such as session description protocol (SDP) and media presentation description (MPD) metadata, etc.). The general specifications for SDP and associated real-time streaming protocol (RTSP) are set forth in the document 3GPP TS 26.234 V10.2.0 (3rd Generation Partnership Project; Technical Specification Group Services and System Aspects; Transparent end-to-end packet switched streaming service (PSS); Protocols and codecs; Release 10, September 2011) (hereinafter "TS 26.234"). The general specifications for the MPD and associated progressive download and dynamic adaptive streaming over HTTP (DASH) protocols are set forth in the document 3GPP TS 26.247 V10.0.0 (3rd Generation Partnership Project; Technical Specification Group Services and System Aspects; Transparent end-to-end packet switched streaming service (PSS); Progressive download and dynamic adaptive streaming over HTTP (3GP-DASH); Release 10, June 2011) (hereinafter "TS 26.247").

FIG. 1 is a schematic diagram illustrating an example environment 100 in which the techniques in accordance with the present disclosure may be implemented. An example environment 100 may include one or more wireless access points 102 that provide a wireless network connection to one or more mobile communications and/or computing devices ("mobile devices") 104 and 106. Mobile devices 104 and 106 may receive multimedia content 108, for example, from the access point 102 and play the multimedia content 108 on a local display and/or stream the multimedia content 108 to a remote display device 110. For instance, the mobile device 104 may be a smartphone, or the like, with a small viewing screen. Examples of mobile device 104 may include without limitation mobile computing devices, laptop computers, handheld computing devices, tablet computing devices, netbook computing devices, personal digital assistant (PDA) devices, reader devices, smart phones, cellular telephones, wearable computers, and so forth. The embodiments are not limited in this context. A user may wish to watch content, such as a video movie streamed from the access point 102 on a larger screen and so may stream the movie to a remote display device 110. In various embodiments the remote display device 110 may be a digital display, a television display, a mobile computing device, a laptop computer, a desktop computer, a handheld computing device, tablet computing device, netbook computing device, smart phone, and so forth. The embodiments are not limited in this context.

In various implementations, the access point may be coupled to a network 112 (e.g., Ethernet, service provider network, internet provider, local area network (LAN), wide area network (WAN), wireless local area network (WLAN), etc.). Further, multimedia content 108 may originate at one or more local servers 114 and/or remote servers 116 (e.g., including the Internet, or the like) that are coupled to the network 112.

Implementations of adaptive content streaming to remote display devices 110 within an example environment 100 can consider changing link conditions over the many distinctive communication links; the individual device capabilities of the various devices; and the diverse characteristics of a variety of content forms that may be streamed, as well as other factors.

Exemplary Adaptive Streaming System

Figure 2:
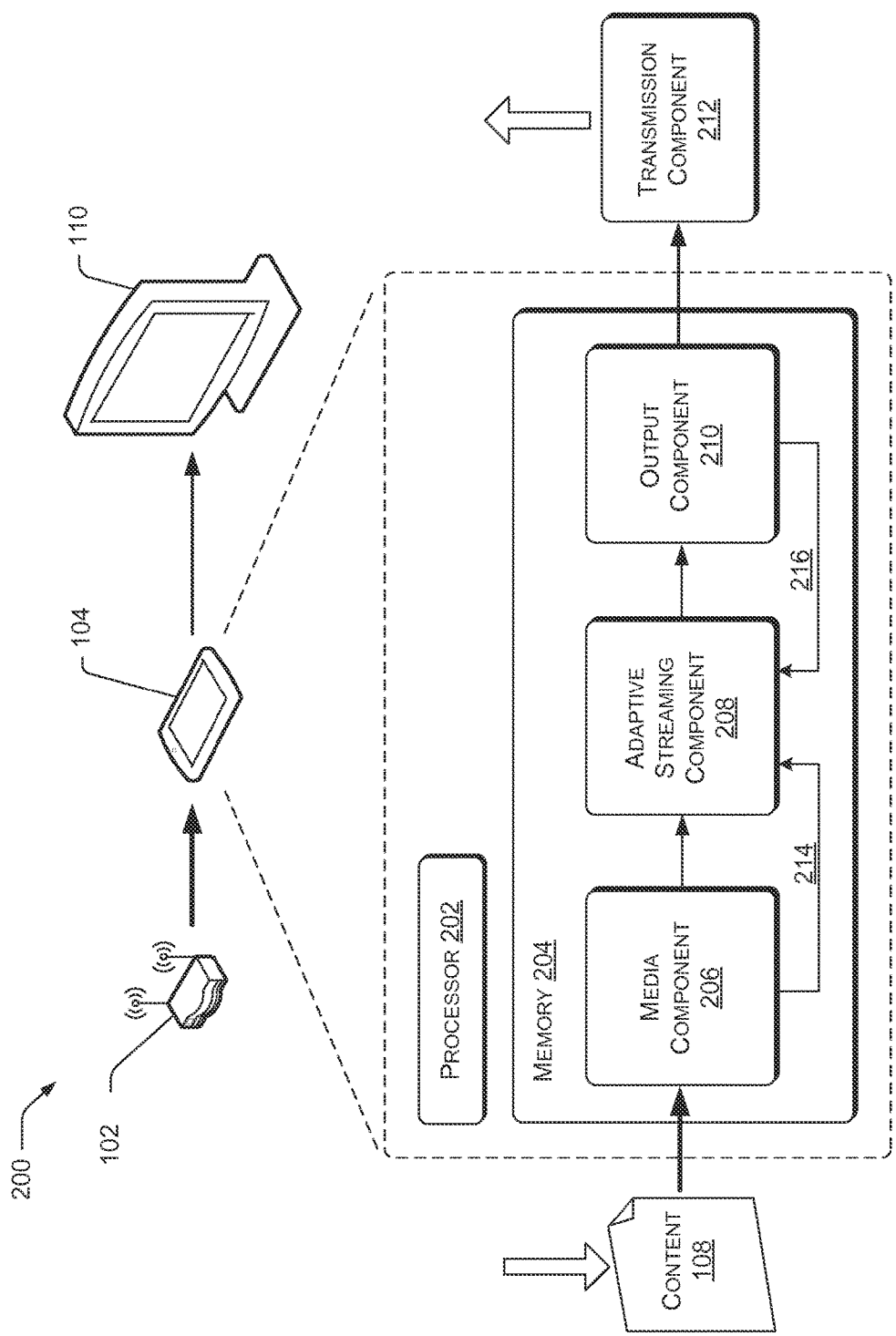
FIG. 2 is schematic diagram illustrating an example system implementing techniques according to the present disclosure.

FIG. 2 is schematic diagram illustrating an example system 200 implementing techniques according to the present disclosure. For the purposes of discussion, and as shown in FIG. 2, the system 200 is described with reference to an example mobile device 104. An example mobile device 104 may include a smartphone, a personal digital assistant (PDA), a tablet or reader device, a notebook or laptop computer, and the like. Further, the techniques disclosed herein also can apply to other types of computing devices (such as a desktop, mini, or mainframe computer, communication and/or computing modules integrated into larger systems, and the like). In alternate implementations, the system 200 and/or the mobile device 104 may contain fewer components than illustrated in FIG. 2 or may contain additional or alternate components, and remain within the scope of the disclosure.

In an implementation, the mobile device 104 receives multimedia content 108 (e.g., audio, video, photos, games, moving scene, timed text, etc.) from an access point 102 and streams the multimedia content wirelessly to a remote display device 110. In one embodiment, the mobile device 104 includes functionality to adaptively stream the multimedia content 108, dynamically optimizing various streaming parameters and/or configurations based on one or more communication links, the devices associated with the links, and/or the characteristics of the multimedia content 108 being streamed. In this context, the mobile device 104 can simultaneously adapt streaming configurations for streaming multimedia content 108 from network 112 to mobile device 104 and for streaming multimedia content 108 from mobile device 104 to the remote display device 110. In alternate implementations, other components of the system 200 may include at least a part of the functionality to adaptively stream the multimedia content 108. For example, in an implementation, the remote display device 110 may include some of the system functionality for streaming multimedia content 108.

As shown in FIG. 2, the mobile device 104 may include one or more processors 202 and one or more memory devices 204 coupled to the processor(s) 202. Processor(s) 202 may include computing devices of various types that are capable of executing computer-accessible instructions to perform the operations disclosed. In various implementations, functional components may be stored in the memory 204 and be operable on the processor 202 to provide adapt streaming functionality to the system 200. For example, as shown in FIG. 2, the memory 204 may include a media component 206, an adaptive streaming component 208 and an output component 210.

In some implementations, the memory device(s) 204 may include one or more computer accessible media. Functional components may be stored in the form of computer executable instructions directing the processor 202 to perform operations that provide the adaptive streaming functionality to the system 200. The terms "computer accessible media" and "computer-readable media" include computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

The mobile device 104 may also include a transmission component 212. Alternately, the transmission component 212 may be peripherally coupled or remote to the mobile device 104. Further, the system 200 may provide a feed-forward element 214 and/or a feedback element 216, as shown in FIG. 2.

If included, the media component 206 is configured to play (e.g., perform, present, interpret, etc.) the multimedia content 108. The media component 206 receives the multimedia content 108 streamed from the network 112, plays the multimedia content 108 using a visual and/or audio presentation device (e.g., a screen, a display, a speaker, etc.) and/or plays to video and/or audio outputs. The presentation device may be local or remote to the media component 206 and/or the mobile device 104. In one embodiment, the media component 206 plays the multimedia content 108 on a local display (i.e., integral to the mobile device 104) concurrently while streaming the multimedia content 108 to the remote display device 110.

In various embodiments, the media component 206 may include one or more of a multimedia framework, media player, a media player application, various media drivers, and the like. Accordingly, the media component 206 contains, or has access to, the characteristics of the multimedia content 108, to play the multimedia content 108. In some embodiments, during the delivery of multimedia content 108 from the network 112 to the mobile device 104, the media component 206 may also dictate the characteristics of the multimedia content 108, e.g., by controlling various streaming configurations such as bitrate, resolution, frame rate, coding/compression schemes, codec configurations, container formats, quality of service (QoS) parameters, etc.

In an implementation, the feed-forward element 214 is associated with the media component 206 and provides content information (i.e., one or more characteristics of the multimedia content 108) to parts of the system 200 (e.g., the adaptive streaming component 208, etc.) from the media component 206. In one embodiment, the feed-forward element 214 is an application programming interface (API) stored in the memory 204 and operable on the processor 202 to provide content information to the system 200. In one embodiment, the feed-forward element 214 is used to coordinate between the actions of the media component 206 and those of the adaptive streaming component 208 in order to jointly determine the stream configurations that optimize the user quality of experience.

If included, the adaptive streaming component 208 is configured to dynamically optimize various streaming parameters and/or configurations relative to streaming the multimedia content 108 from the mobile device 104 to the remote display device 110. These streaming parameters and/or configurations say include bitrate, frame rate, resolution, various coding/compression schemes, codec configurations, container formats, quality of service (QoS) parameters. In various embodiments, the adaptive streaming component 208 may include one or more of a video streaming application, a video streaming service, various video streaming drivers, and the like.

In one implementation, the adaptive streaming component 208 monitors and selects video encoder bitrate during the streaming from the mobile device 104 to the remote display device 110. The adaptive streaming component 208 also receives content information from the media component 206 such as the video bitrates of content delivered to the mobile device 104 from the network 112 via the feed-forward element 214 (i.e., content awareness). The adaptive streaming component 208 selects a video encoder bitrate based on the video bitrate information and other content information received from the media component 206. In addition, the adaptive streaming tray account for the link conditions between the mobile device 104 and remote display device 110, and the capabilities of the mobile device 104 and remote display device 110 in determining the video encoder bitrate. In one example, the adaptive streaming component 208 selects a video encoder bitrate for a new content stream. In another example, selecting a video encoder bitrate means adjusting are existing video encoder bitrate for an existing content stream, based on content awareness, link awareness, and/or device awareness.

In another implementation, the adaptive streaming component 208 receives link quality information and selects a video encoder bitrate based on the video bitrate information and other content information received from the media component 206, and the link quality information. For example, the adaptive streaming component 208 may select the video encoder bitrate to be the minimum value of the bitrate that would be selected based on video bitrate information and the content information received from the media component 206, and the bitrate that would be selected based on monitoring the quality of the link between the mobile device 104 and remote display device 110. In one embodiment, the adaptive streaming component 208 receives the link quality information from the feedback element 216.

In a implementation, the feedback element 216 is another API stored in the memory 204 and operable on the processor 202 to provide link quality information to the system 200. In one example, the feedback element 216 is associated with a physical radio layer of the mobile device 104. In another example, the feedback element 216 is associated with a transport layer of a transmission control protocol (TCP) of the mobile device 104. In an alternate example, the feedback element 216 is associated with another part of the system 200, such that the feedback element 216 has access to link quality information about the system 200.

In an implementation, the adaptive streaming component 208 receives the multimedia content 108 from the media component 206 and encodes the multimedia content 108 based on the selected video encoder bitrate in preparation to streaming the multimedia content 108. If included, the output component 210 receives the encoded multimedia content 108 from the adaptive streaming component 208 and outputs the encoded content 108 to a wireless transmission device of the system 200. In one example, the output component 210 receives the encoded multimedia content 108 from the adaptive streaming component 208 and provides it to the transmission component 212 for streaming.

In various embodiments, the output component 210 may include one or more of a wireless transmission application, various wireless networking drivers, and the like. Accordingly, the output component 210 may contain, or have access to, characteristics of one or more of the communication links of the environment 100. In an implementation, the feedback element 216 is associated with the output component 210 and provides link information (i.e., one or more characteristics of the communication link) to parts of the system 200 (e.g., the adaptive streaming component 208, etc.).

The transmission component 212 wirelessly streams the content 108 to the display device 110. In various embodiments, the transmission component 212 may include one or more of a wireless radio application, a wireless radio device, and the like. In one embodiment, the feedback element 216 is associated with the transmission component 212 and provides link quality information from the transmission component 212 to the system 200.

In one implementation, the remote display device 110 is wirelessly coupled to the transmission component 212 and is configured to display the multimedia content 108 (i.e., video and/or audio content) streamed by the transmission component 212.

In alternate implementations, the system 200 includes one or more other wireless nodes (e.g., an access point, a wireless adapter, a digital living network alliance (DLNA) enabled terminals, etc.) coupled to the remote display device 110. The one or more other nodes (not shown) receive the content 108 streamed by the transmission component 212, for example, and wirelessly stream the multimedia content 108 to the remote display device 110. In some implementations, the multimedia content 108 is streamed to multiple nodes, in a plurality of "hops," with the last node in the "chain" streaming the content to the remote display device 110. In the alternate implementations, the system 200 may be content aware, link aware, and/or device aware, to include the plurality of hops. For example, the adaptive streaming component 208 may dynamically optimize various streaming parameters and/or configurations relative to streaming the multimedia content 108 based on the one or more other wireless nodes, the corresponding communication links, and the like. Accordingly, the adaptive streaming component 208 selects a video encoder bitrate based on the video bitrate information and other content information received from the media component 206, and link quality information of wireless links coupling the other nodes to each other and to the system 200 and/or environment 100.

Exemplary Adaptation for Dynamic Optimization

Figure 3:
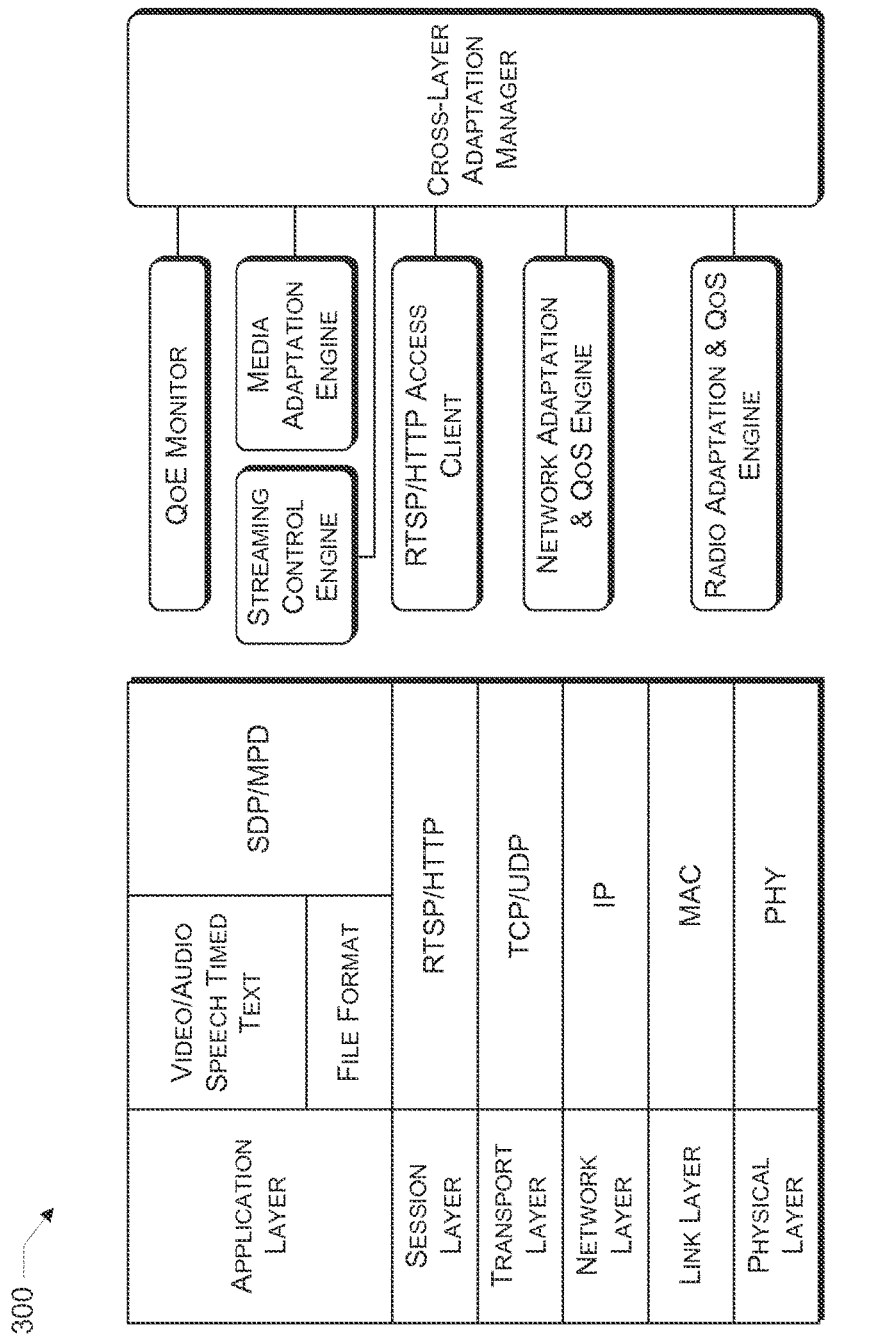
FIG. 3 is a block diagram illustrating example architecture for an adaptive streaming arrangement according to an implementation.

As discussed above, an example system 200 is configured to dynamically optimize various streaming parameters and/or configurations relative to wirelessly streaming the multimedia content 108 to a remote display device 110. FIG. 3 is a block diagram illustrating example architecture 300 for an adaptive streaming arrangement that may be applied to a system 200 according to an implementation.

The example architecture 300 of FIG. 3 shows a cross-layer optimization framework with associated client platform architecture and protocol stack. A high-level version of the architecture 300 may employ one or more specific algorithms to provide the optimized adaptive streaming in a system 200. Streaming control and session management components built over this cross-layer optimization framework and associated protocol stack have the ability to jointly perform multimedia adaptation (e.g., video bitrate, resolution, frame rate, etc.), and select of target QoS parameters for different wireless connections in a content-aware manner from the session description protocol (SDP) for RTSP-based adaptive streaming or media presentation description (MPD) for HTTP-based adaptive streaming, and based on receiver device/display capabilities and/or physical link conditions.

Figure 4:
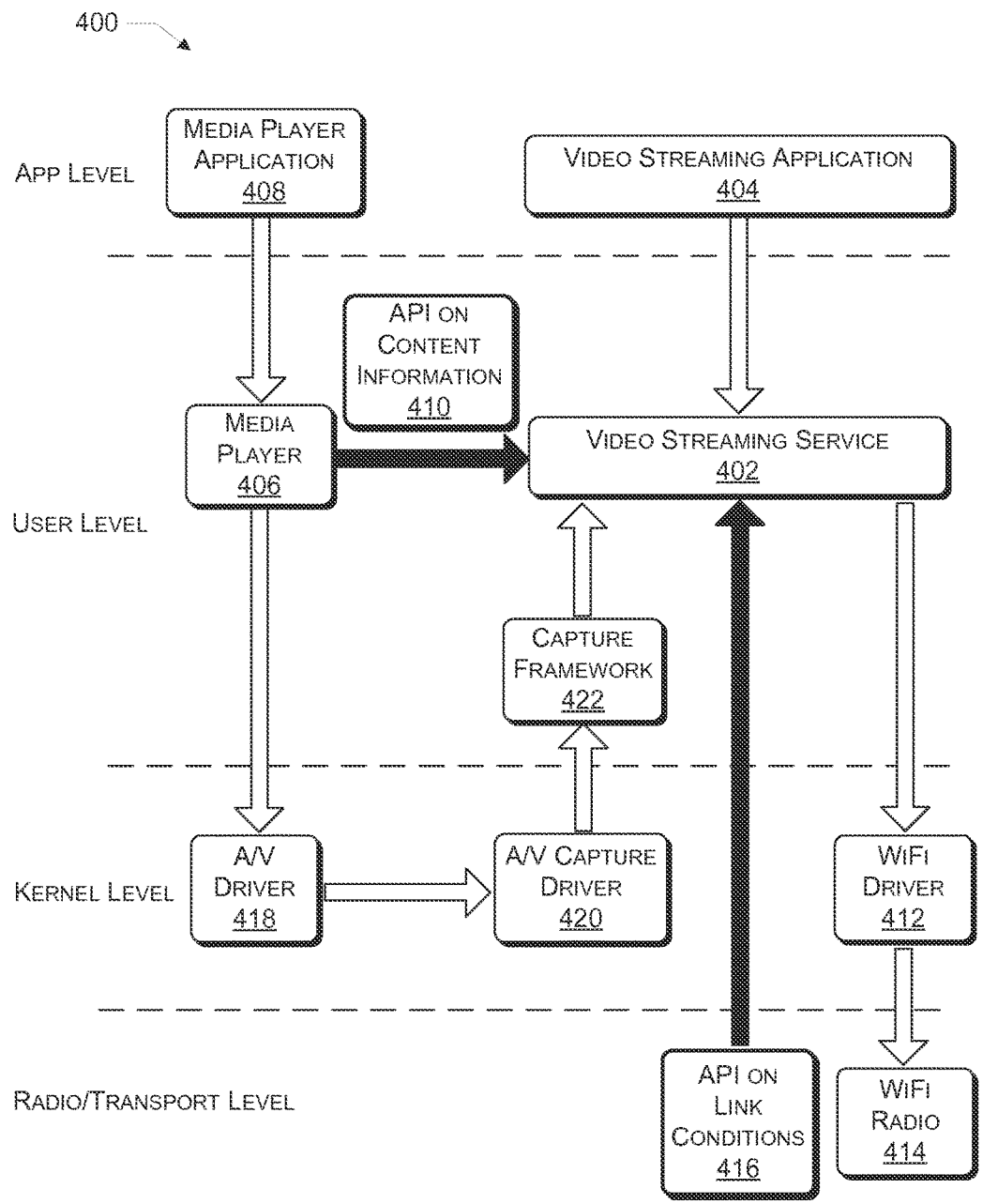
FIG. 4 is block diagram illustrating information flow in an example adaptive streaming architecture according to an implementation.

FIG. 4 is block diagram of an architecture 400 illustrating one example of information flow according to an example algorithm applied to a system 200. The architecture 400 shows cross-layer (i.e., cross-level) information flow between portions of the system 200 as implemented. For example, a video streaming service 402 at the user level may receive information from the application ("app") level, other components of the user level, the kernel level, and the radio/transport level. The information received from the various levels provides one or more of content-awareness, link-awareness, and device-awareness to the video streaming service 402.

In an embodiment, the video streaming service 402 is implemented as part of the adaptive streaming component 208, and dynamically optimizes the various streaming parameters and/or configurations relative to streaming the multimedia content 108. The video streaming service 402 provides the adaptation/optimization based on the information received in the cross-level information flow. The video streaming application 404 provides control to the video streaming service 402.

In one implementation, the media player 406 is implemented as part of the media component 206, and plays the multimedia content 108 as discussed above. The media player application 408 provides control to the media player 406. The API on content information 410 represents the feed-forward element 214 discussed above, and provides multimedia content information to the video streaming service 402 from the media player 406. In one implementation, the API on content information 410 may carry multimedia content information specific to a preselected number of content frames (i.e., an observation window). In another implementation, the multimedia content information is averaged over the preselected number of content frames for use by the video streaming service 402.

In one embodiment, as shown in FIG. 4, the WiFi driver 412 represents one implementation of a component of the output component 210. In the implementation, the multimedia content 108 is streamed to the remote display device 110 via a WiFi transmission link (e.g., IEEE 802.11). In alternate implementations, the multimedia content 108 is streamed using other wireless technologies (e.g., ultra-wideband, 60 GHz technology, Bluetooth™, radio frequency (RF) infrared, etc.). The WiFi driver 412 receives the encoded multimedia content 108 from the video streaming service 402 and outputs it to the WiFi radio 414 for transmission to the remote display device 110. In an embodiment, the WiFi radio 414 is implemented as part of the transmission component 212.

In an implementation, the API on link conditions 416 represents the feedback element 216 discussed above, and provides link quality information to the video streaming service 402 from the radio level and/or the transport level.

Figure 5:
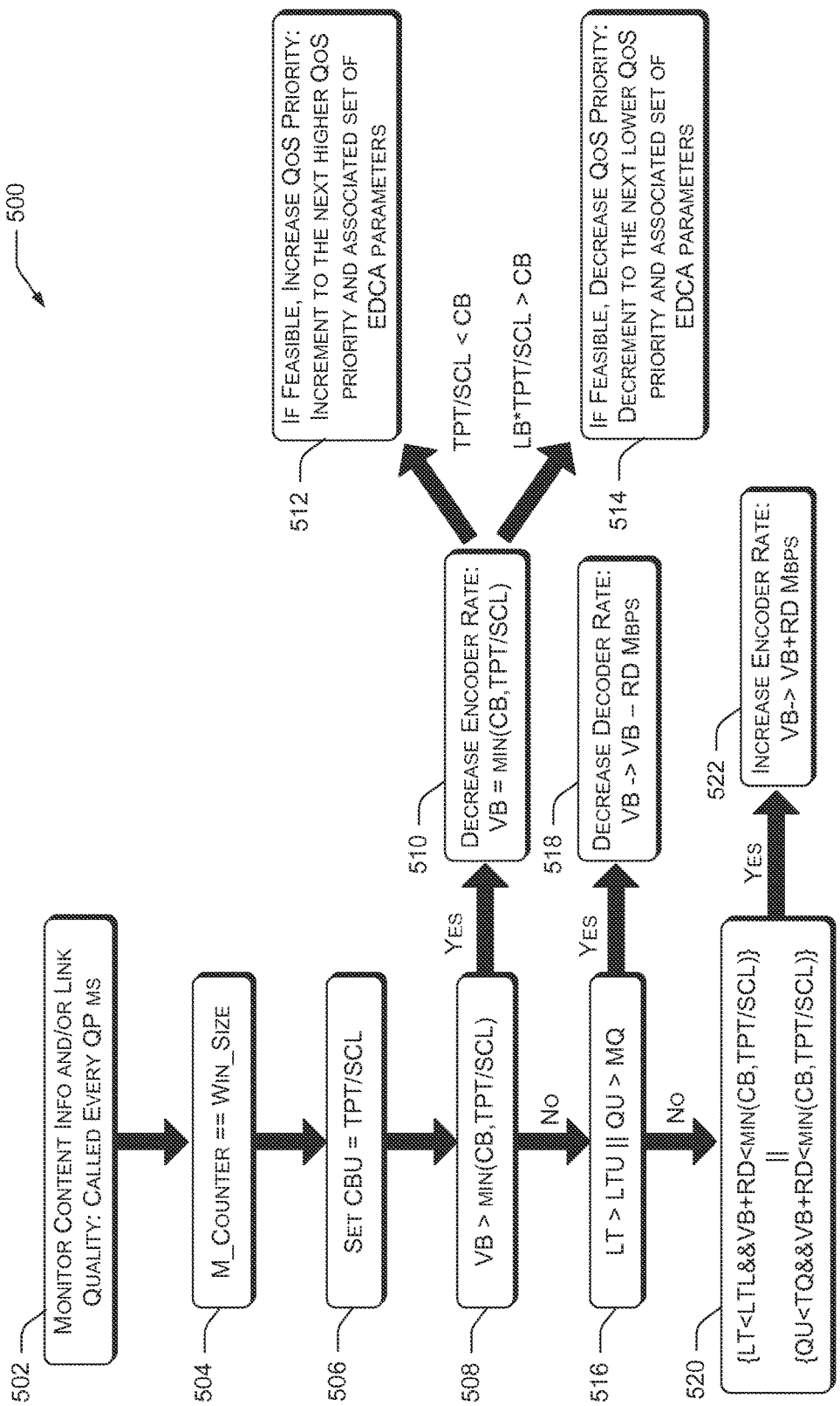
FIG. 5 is block diagram illustrating logic flow in an example algorithm for an adaptive streaming architecture according to an implementation.

In one embodiment, the audio/video (A/V) Driver 418 is implemented as part of the media component 206 and supports playing of the content 108. The A/V capture driver 420 and the capture framework 422 may also be implemented in the memory 204. The capture framework 422, supported by the A/V capture driver 420, captures the multimedia content rendered on the mobile device 104, decodes it and passes it to the video streaming service 102 for re-encoding toward transmission to the remote display device 410. FIG. 5 is a block diagram illustrating logic flow of an example algorithm 500 for an adaptive streaming architecture (such as architecture 400, for example) according to an implementation. Not all operations of the algorithm 500 are necessary to be performed in all implementations. Further in alternate implementations, fewer operations may be used, or alternate or additional operations may be included and remain within the scope of the disclosure.

The variables included in FIG. 5 for the video adaptation parameters are described/defined as follows:

VB: Video encoder bitrate employed in the adaptive streaming component 208 to compress captured video at the mobile device 104 for multimedia content 108 (in Mbps)

CB: Content bitrate information gathered from the media component 206 regarding multimedia content 108 (in Mbps)

TPT: Estimated throughput for a wireless communication link from the mobile device 104 to the remote display device 110 (in Mbps)

CBU: Maximum content bitrate that the media component 206 may use (in Mbps) in a particular situation RD: Bitrate increment used to scale up or scale down video encoder bitrate (in Mbps)

SCL: Scaling factor defined as the ratio between the throughput estimate TPT (streaming link/TCP throughput) and the corresponding video bitrate (codec level), to account for one or more communication overheads (RTP, UDP/TCP, IP, MAC, PHY headers, etc.)

LT: Target latency of the streaming link between the mobile device 104 and the remote display device 110 (in milliseconds). For example, it may be desirable that the streaming link latency does not exceed a maximum of LTU, e.g., 100 ms LTL: Latency threshold for the streaming link between the mobile device 104 and the remote display device 110 to allow increasing bitrate LTU: Maximum allowed latency for the adaptive streaming application over the link between the mobile device 104 and the remote display device 110

QU: Number of packets in the wireless media access control (MAC) layer or application layer queue on encoded multimedia content 108

TQ: Target queue size to ensure minimal number of packets in the queue

MQ: Maximum allowed queue size in terms of number of packets

LB: Bandwidth ratio between the next lower QoS priority level and current QoS priority level M_Counter: Current number of content frames in the observation window.

Win_Size: Size of the observation window in number of frames, e.g., group of pictures (GOP) size when the adaptation decisions are made on a GOP-by-GOP basis QP: Period over which link quality and/or content information are monitored (in milliseconds)

The adaptive algorithm 500 depicted in FIG. 5 may be implemented on a system 200 as follows:

At block 502, the adaptive streaming component 208 receives and monitors multimedia content information and/or link quality information. In one implementation, the adaptive streaming component 208 monitors the information every QP milliseconds, where QP is a preselected value. Further, the content information and/or link quality information is provided to the adaptive streaming component 208 via one or more APIs.

At block 504, the adaptive streaming component 208 observes a preselected number M_Counter of content frames. In one example, algorithm 500 is executed when the number of frames M_Counter is set to the value Win_Size.

At block 506, when the multimedia content 108 to be streamed is received from the network 112, set CBU=TPT/SCL to limit the maximum bitrate in the media component 206 to the scaled throughput of the streaming link between the mobile device 104 and remote display device 110. For instance, if streaming throughput for the link between the mobile device 104 and remote display device 110 is low due to the Internet connection, this helps to prevent network resources from being wasted on fetching high bitrate content that the streaming link from the mobile device 104 to the remote display device 110 will not be able to support. It may not be desirable to execute the operation at block 506 when the multimedia content 108 is derived locally or from another source supporting higher bitrate streaming.

At block 508, the system 200 (at the adaptive streaming component 208, for example) checks the relationship among VB, CB and TPT. The system checks to determine if the video encoder bitrate VB exceeds either CB (due to content awareness) or TPT/SCL (due to link awareness). When VB exceeds one of these quantities, VB is scaled down (by the adaptive streaming component 208, for example) to the minimum of these quantities (at block 510).

Further, at block 510, the system 200 (at the adaptive streaming component 208, for example) checks the relationship between CB and TPT/SCL. If CB is larger than TPT/SCL, this means that the capacity/throughput for the link between the mobile device 104 and remote display device 110 is not high enough to meet the bitrate requirements for the multimedia content 108. Consequently, if feasible, the adaptive streaming component 208 increases the QoS priority to the next higher QoS priority level, and in case of a WiFi-based link between the mobile device 104 and remote display device 110, this means using associated enhanced distributed channel access (EDCA) parameters to increase the streaming link throughput (at block 512).

If CB is smaller than LB*TPT/SCL, this means that the capacity/throughput for the link between the mobile device 104 and remote display device 110 is high enough to meet the bitrate requirements for the multimedia content 108 even when the next lower QoS priority level is used. Consequently, if feasible, the adaptive streaming component 208 decreases the QoS priority to the next lower QoS priority level, and in case of a Wifi-based link between the mobile device 104 and remote display device 110, this means using associated EDCA parameters to save on network bandwidth resources while still meeting the content bitrate requirements (at block 514).

At block 516, if the streaming latency for the link between the mobile device 104 and remote display device 110 exceeds LTU (e.g., 100 ms) or the number of packets in the queue QU exceeds MQ, the adaptive streaming component 208 scales down the video encoding bitrate VB by an increment of RD (e.g., by 1 Mbps) in order to reduce link latency (at block 518).

At block 520, the adaptive streaming component 208 determines if the video encoder bitrate may be increased. Provided that the latency LT is low enough (below LTL, e.g., 33 ms) and the queue size QU is small enough, and the condition that the incremented video encoding bitrate VB+RD does not exceed neither CB TPT/SCL, the adaptive streaming component 208 scales up the video encoding bitrate VB by an increment of RD (e.g., by 1 Mbps) in order to deliver better quality to the end user (at block 522).

In one implementation, the conditions compared and analyzed in the operations of algorithm 500 illustrated in FIG. 5 are based on link quality metrics and content information averaged over the entire observation window (tracked by the variable M_Counter and parameter Win_Size). The video bitrate and QoS priority parameters are also adapted over this observation window. In alternate implementations, the conditions may be based on other preselected durations, including randomly selected durations.

In an alternate embodiment, the codec used to encode the video component in multimedia content 108 retrieved by the media component 206 may be different from the codec used by the adaptive streaming component 208 for encoding the video component in multimedia content 108 sent over the streaming link. In that case, a suitable mapping based on the rate distortion profiles of the two different codecs is applied in order to compare CB and VB, such that the corresponding quality levels are similar or identical.

Exemplary Processes

Figure 6:
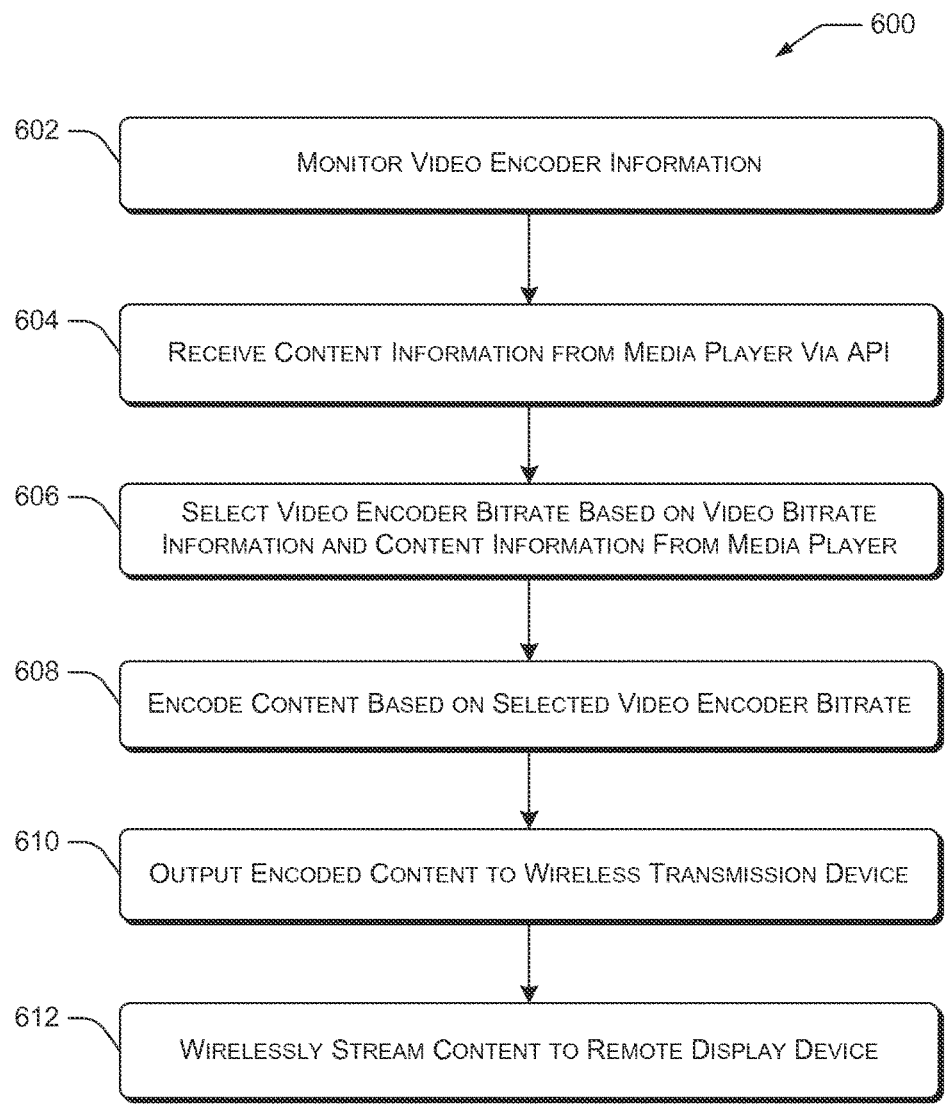
FIG. 6 is a flow chart illustrating an example method for adaptive streaming according to an implementation.

FIG. 6 is a flow diagram illustrating an example process 600 that implements the techniques described herein for wirelessly streaming content to a remote display device. The example process 600 is performed, at least in part, by an adaptive wireless streaming system such as system 200. The process 600 is described with reference to FIGS. 1-5.

At operation 602, the process includes monitoring (by an adaptive streaming component such as the adaptive streaming component 208, for example) video encoder bitrate information. In an implementation, where the component performing the monitoring is the same component that selects or provides the video encoder bitrate information, the monitoring may be a passive operation since the component is aware of the information.

At operation 604, the process includes receiving video bitrate information and other content information from a media player (such as media player 406, for example) via an application programming interface (API) associated with the media player (such as feed-forward element 214 and API 410, for example). For example, the content information may include at least one of minimum bitrate, maximum bitrate, current bitrate, resolution, frame rate, content type, codec information, and the like.

At operation 606, the process includes selecting a video encoder bitrate based on the video bitrate information and other content information from the media player. In one implementation, the adaptive streaming component 208 selects the video encoder bitrate. For example, the adaptive streaming component 208 may select a new video encoder bitrate for a new content stream, or the adaptive streaming component 208 may select a video encoder bitrate by adjusting a current video encoder bitrate associated with an existing content stream. The adaptive streaming component 208 may adjust the video encoder bitrate based on content information, link information and/or device information received.

In one implementation, the process includes decreasing the video encoder bitrate when the video encoder bitrate is greater than at least one of the content bitrate and the wireless link throughput, scaled to account for communication overhead. In another implementation, the process includes decreasing the video encoder bitrate by a preselected increment when the latency of the wireless stream exceeds a preselected latency threshold or a number of packets in a queue at the wireless transmission device exceeds a preselected queue size threshold.

In a further implementation, the process includes increasing the video encoder bitrate by a preselected increment when a latency of the wireless stream is less than or equal to a preselected latency threshold or a number of packets in a queue at the wireless transmission device is less than or equal to a preselected queue size threshold, and the incremented video encoder bitrate is less than both the content bitrate and the wireless link throughput, scaled to account for communication overhead.

In one embodiment, the process also includes receiving link quality information from another API (such as feedback element 216 and API 416) and selecting the video encoder bitrate based on the video bitrate information and other content information from the media player, and the link quality information. In one example, the video encoder bitrate is selected to comprise a minimum of the video bitrate for the multimedia content 108 rendered by the media player, and the wireless link throughput, scaled to account for communication overhead.

In alternate implementations, the other API is associated with a physical radio layer of a wireless transmission device, the other API is associated with a transport layer of a transmission control protocol (TCP) of the wireless transmission device, or the other API is associated with one or more other portions of an adaptive streaming system. In the various implementations, the other API has access to link quality information and provides the link quality information to the system.

In another implementation, the process includes receiving one or more signals (by an adaptive streaming component, for example) from the remote display device and selecting the video encoder bitrate based at least in part on the one or more signals received (device awareness). For example, the remote display device may send display capabilities, parameters, and/or characteristics information to the system via signals.

At operation 608, the process includes encoding the content (such as multimedia content 108, for example) based on the selected video encoder bitrate. In an implementation, the adaptive streaming component 208 encodes the content.

At operation 610, the process includes outputting the encoded content (by an output component such as output component 210, for example) to a wireless transmission device (such as transmission component 212, for example).

At operation 612, the process includes wirelessly streaming the content to the remote display device (such as remote display device 110, for example) via the wireless transmission device.

In one implementation, the process includes setting a maximum content bitrate in the media player to a value based on a scaled wireless throughput for the link between the mobile device 104 and remote display device 110 when the content received from the network 112.

In another implementation, the process includes requesting a lower resolution version of the content from the source of the content (i.e., local server 114 or remote server(s) 116) when a link quality for the link between the mobile devise 104 and remote display device 110 exceeds a minimum link threshold or a latency value exceeds a minimum latency threshold. For example, to prevent or reduce interruptions and delays (such as for buffering, for example) during streaming, the process can request a lower quality (lower resolution, e.g., 720p versus 1080p, for example) version of the content from the source. In various implementations, the process can automatically request the lower quality version of the content, and stream the lower quality version of the content without user interaction. In other implementations, the process may include a user notification and/or verification prior to requesting and streaming the lower quality version.

In one implementation, the process includes increasing a quality of service (QoS) priority and in case of a WiFi-based link between the mobile device 104 and remote display device 110, the associated enhanced distributed channel access (EDCA) parameters when a content bitrate is greater than a scaled wireless link throughput. Further, in an implementation the process includes decreasing the quality of service (QoS) priority and the associated enhanced distributed channel access (EDCA) parameters when the video content bitrate is less than the scaled wireless link throughput, modified by a QoS bandwidth ratio.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

Additional and Alternative Implementation Notes

In the above description of exemplary implementations, for purposes of explanation, specific numbers, materials configurations, and other details are set forth in order to better explain the present invention as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as an example or as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

What is claimed is:

1. A method of wirelessly streaming multimedia content from a wireless transmission device to a remote display device, the method comprising:
    receiving a content information from a media player of the wireless transmission device via an application programming interface (API) associated with the media player, wherein the content information corresponds to the multimedia content played by the media player;
    receiving a link quality information of a link between the wireless transmission device and the remote display device from an output component of the wireless transmission device through a feedback element using another API;

selecting a video encoder bitrate based on the received content information and the link quality information;
encoding the multimedia content based on the selected video encoder bitrate;
outputting the encoded content through the output component for wirelessly streaming the encoded multimedia content to the remote display device.

2. The method of claim 1, wherein the content information comprises at least one of: a minimum bitrate, a maximum bitrate, a current bitrate, a resolution, a frame rate, a content type, and a codec information.

3. The method of claim 1, wherein the another API is associated with a physical radio layer of the wireless transmission device.

4. The method of claim 1, wherein the another API is associated with a transport layer of a transmission control protocol (TCP) of the wireless transmission device.

5. The method of claim 1, further comprising receiving one or more signals from the remote display device and selecting the video encoder bitrate based at least in part on the one or more signals received.

6. The method of claim 1, wherein the video encoder bitrate is increased by a preselected increment for a latency that is lesser than or equal to a preselected latency threshold.

7. The method of claim 1, further comprising requesting a lower resolution version of the multimedia content when a number of packets in a queue at the wireless transmission device exceeds a preselected queue size threshold or a latency value exceeds a preselected latency threshold.

8. The method of claim 1, further comprising:
increasing a quality of service (QoS) priority and associated enhanced distributed channel access (EDCA) parameters when a content bitrate is greater than a scaled wireless link throughput; and
decreasing the quality of service (QoS) priority and the associated enhanced distributed channel access (EDCA) parameters when the content bitrate is less than the scaled wireless link throughput, modified by a QoS bandwidth ratio.

9. The method of claim 1, wherein the content information is received through a feed-forward component of the media player.

10. At least one non-transitory computer accessible medium comprising computer executable instructions that, when executed by a wireless transmission device, direct the wireless transmission device to perform operations including:
receiving a content information from a media player of the wireless transmission device via an application programming interface (API) associated with the media player, wherein the content information corresponds to a multimedia content played by the media player;
receiving a link quality information of a link between the wireless transmission device and a remote display device from another API through a feedback element of the wireless transmission device;
selecting a video encoder bitrate based on the received content information and the link quality information;
encoding the multimedia content based on the selected video encoder bit rate; and
outputting the encoded multimedia content to an output component of the wireless transmission device to wirelessly stream the encoded content to the remote display device.

11. The at least one non-transitory computer accessible medium of claim 10, wherein the content information comprises at least one of: a minimum bitrate, a maximum bitrate, a current bitrate, a resolution, a frame rate, a content type, and a codec information.

12. The at least one non-transitory computer accessible medium of claim 10, wherein the computer executable instructions direct the computer to perform further operations comprising: decreasing the video encoder bitrate when the video encoder bitrate is greater than at least one of a content bitrate and a wireless link throughput.

13. The at least one non-transitory computer accessible medium of claim 10, wherein the computer executable instructions direct the computer to perform further operations comprising:
increase a quality of service (QoS) priority and associated enhanced distributed channel access (EDCA) parameters when a content bitrate is greater than a scaled wireless link throughput; and
decrease the quality of service (QoS) priority and the associated enhanced distributed channel access (EDCA) parameters when the content bitrate is less than the scaled wireless link throughput, modified by a QoS bandwidth ratio.

14. The at least one non-transitory computer accessible medium of claim 10, wherein the computer executable instructions direct the computer to perform further operations comprising: decrease the video encoder bitrate by a preselected increment when a latency of the wireless stream exceeds a preselected latency threshold or a number of packets in a queue at the wireless transmission device exceeds a preselected queue size threshold.

15. The at least one non-transitory computer accessible medium of claim 10, wherein the computer executable instructions direct the computer to perform further operations comprising:
increase the video encoder bitrate by a preselected increment when a latency of the wireless stream is less than or equal to a preselected latency threshold or a number of packets in a queue at the wireless transmission device is less than or equal to a preselected queue size threshold, and the incremented video encoder bitrate is less than a content bitrate and a wireless link throughput, scaled to account for communication overhead.

16. A wireless transmission device, comprising:
a processor;
memory coupled to the processor;
a media component stored in the memory and operable on the processor to play a received multimedia content;
an adaptive streaming component stored in the memory and operable on the processor to:
receive a content information corresponding to the multimedia content from the media component via an application programming interface (API);
receive a link quality information of a link between the wireless transmission device and a remote display device from another API through a feedback element of an output component operable on the wireless transmission device;
select a video encoder bitrate based on the received content information and the link quality information;
encode the multimedia content based on the selected video encoder bitrate; and
output the encoded content to the output component; and
an output component stored in the memory and operable on the processor to output the encoded content; and a transmission component configured to wirelessly stream the encoded multimedia content to the remote display device.

17. The wireless transmission device of claim 16, wherein the feedback element is coupled to the output component.

18. The wireless transmission device of claim 16, wherein the content information comprises at least one of: a minimum bitrate, a maximum bitrate, a current bitrate, a resolution, a frame rate, a content type, and a codec information.

\* \* \* \* \*